(12) United States Patent
McAdams et al.

(10) Patent No.: US 10,986,081 B1
(45) Date of Patent: Apr. 20, 2021

(54) CROSS-ORGANIZATION REGISTRATION FOR SINGLE SIGN-ON

(71) Applicant: Amazon Technologies, Inc., Seattle, WA (US)

(72) Inventors: Darin Keith McAdams, Seattle, WA (US); Dick Clarence Hardt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 470 days.

(21) Appl. No.: 15/719,379

(22) Filed: Sep. 28, 2017

(51) Int. Cl.
*H04L 29/00* (2006.01)
*H04L 29/06* (2006.01)

(52) U.S. Cl.
CPC ........ *H04L 63/0815* (2013.01); *H04L 63/083* (2013.01); *H04L 63/108* (2013.01)

(58) Field of Classification Search
CPC ....... G06F 21/606; H04L 63/04; H04L 63/08; H04L 63/0815; H04L 63/10
See application file for complete search history.

(56) References Cited

U.S. PATENT DOCUMENTS

| | | | | |
|---|---|---|---|---|
| 7,702,747 | B1* | 4/2010 | Liu | G06F 21/41 709/205 |
| 2015/0033297 | A1* | 1/2015 | Sanso | H04L 63/104 726/5 |
| 2015/0242643 | A1* | 8/2015 | Hankins, Jr. | H04L 63/04 726/26 |
| 2016/0248756 | A1* | 8/2016 | Cicchitto | G06F 21/32 |
| 2017/0149784 | A1* | 5/2017 | White, Jr. | H04L 63/0815 |

* cited by examiner

*Primary Examiner* — Jeffrey C Pwu
*Assistant Examiner* — Helai Salehi
(74) *Attorney, Agent, or Firm* — Davis Wright Tremaine LLP

(57) ABSTRACT

A managed directory service receives a request from a first service to link a directory of a contractor service to the first service's directory. The managed directory service identifies a group within the directory of the contractor service and links the directories using this group. Through the link, the managed directory service enables users in the group to authenticate to the first service's directory using credentials for the directory of the contractor service.

20 Claims, 11 Drawing Sheets

CROSS-ORGANIZATION REGISTRATION FOR SINGLE SIGN-ON

BACKGROUND

Customers utilize directory services to create and maintain a directory (e.g., file systems, files, users, security policies, network resources, applications, system storage, etc.) for data management and, generally, access to a variety of resources. However, a customer desiring to enable external entities (e.g., contractors, etc.) to be represented in this directory to enable access to the customer's resources can encounter numerous difficulties. Adding an external entity can often require use of out-of-band processes that can delay the onboarding time for the external entity. Further, if the external entity is terminated or is no longer associated with the customer, removing the external entity from the directory is difficult and can result in the external entity maintaining privileges that it should no longer have. Maintenance of multiple directories on behalf of the customer often increases the administrative burden of the customer, as maintenance and security of the multiple directories requires additional resources to perform.

BRIEF DESCRIPTION OF THE DRAWINGS

Various techniques will be described with reference to the drawings, in which.

DETAILED DESCRIPTION

Figure 1:
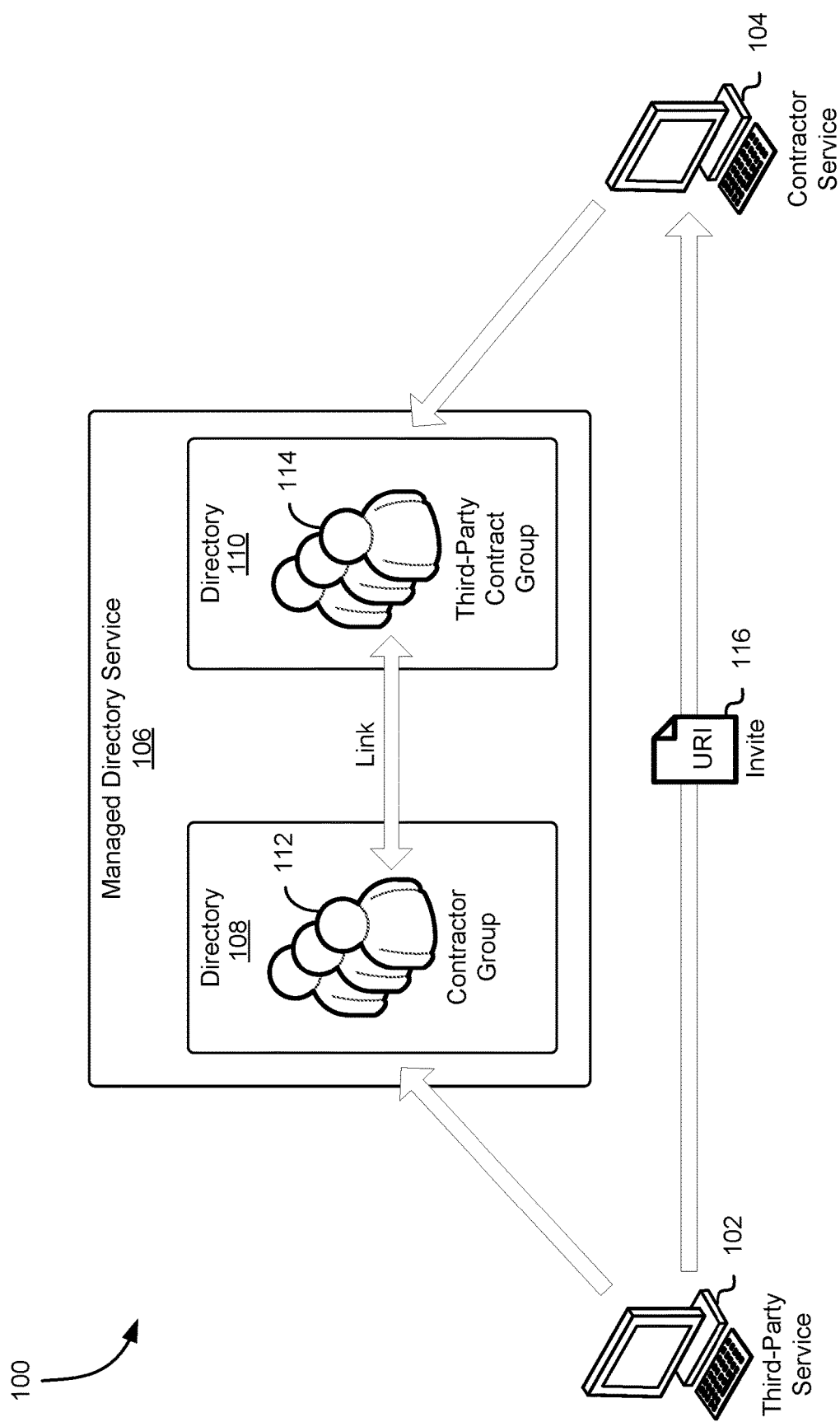
FIG. 1 shows an illustrative example of a system in which various embodiments can be implemented.

Techniques described and suggested herein relate to cross-organization linking of managed directories to enable use of a single set of credentials for accessing resources associated with these managed directories. In an embodiment, a first organization and a second organization each maintain a distinct directory within a managed directory service provided by a computing resource service provider. The first organization and the second organization are engaged in a relationship whereby users in the second organization require access to resources utilized or owned by the first organization. Each directory maintained by the managed directory service is used by a corresponding organization to manage resources, users, and policies that are applicable to these users. In one embodiment, the first organization and the second organization upload user information for a variety of employees and other users to their respective directories. If a relationship is established between the first organization and the second organization, in an embodiment, the first organization creates a new group in its directory. This new group is used to bridge the first organization's directory with the second organization's directory.

In an embodiment, to populate this newly created group, the managed directory service, via a directory control sub-system that interacts with an interface of the managed directory service, transmits, on behalf of the first organization, an invitation to the second organization to link the first organization's directory with the second organization's directory. This invitation is generated on behalf of the first organization by the directory control sub-system of the managed directory service upon request. This request, in one embodiment, is made by the first organization via an interface of the managed directory service. In one embodiment, the invitation includes a Uniform Resource Identifier (URI) that directs the second organization to the managed directory service to provide additional information usable to establish the link between the directories. If a user of the second organization receives the invitation and selects the provided URI, the user is directed to the managed directory service where it can choose whether to accept the invitation to link the directories and allow users of the second organization to be shared with the first organization via these directories. If the user accepts the invitation, in one embodiment, the managed directory service generates a group within the second organization's directory. The second organization, in an embodiment, selects the users that are authorized to access resources tied to the first organization's directory and adds these users to the newly created group within the second organization's directory.

In response to the second organization accepting the invitation from the first organization to link their respective directories, in an embodiment, the managed directory service transmits a notification to the first organization indicating that the invitation has been accepted. The notification, in an embodiment, includes a request for the first organization to review the details regarding the linkage between the directories and to determine whether to activate the link. If the first organization indicates that the link is acceptable, the managed directory service establishes the link between the first organization's directory and the second organization's directory via their respective groups. In an embodiment, the users identified in the second organization's group appear in the first organization's group as a symbolic reference to the users specified in the first directory. In one embodiment, the first organization defines the permissions applicable to the users via its directory group, thus enabling the users defined by the second organization to have access to resources provided by the first organization subject to these permissions.

In this manner, users are assigned to a single directory within their organization and are authorized to utilize their set of credentials for their organization to access resources managed via use of another directory that is linked to their organization's directory. In addition, the techniques described and suggested herein facilitate additional technical advantages. For example, because users defined in a directory appear as a symbolic representation within the linked directory, at any time any organization can sever the link by removing the users from their respective directory group. If this occurs, the linked users are automatically removed from any directories in which they are shared. Further, in an embodiment, an organization defines a time-bound relationship between the directories. Thus, an expiration date is definable on the linked groups such that the link is automatically terminated in response to the expiration date having passed.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. In the system 100, a third-party service 102 transmits a request to a managed directory service 106 to establish a link between a directory 108 of the third-party service 102 and a directory 110 of a contractor service 104. The third-party service 102 and the contractor service 104 are engaged in a relationship whereby employees and other users associated with contractor service 104 are assigned to perform one or more tasks on behalf of the third-party service 102. The managed directory service 106 provides a variety of services to enable computer systems and/or computer system client devices to access system resources including, but not limited to, authentication, authorization and directory services. The managed directory service 106, in one embodiment, provides authentication services which are used to authenticate credentials of a user, computer system, process, automated process or other such entity to at least determine whether that entity is authorized to access the managed directory service 106 and/or the system resources associated with the managed directory service 106. In one embodiment, the credentials are authenticated by the managed directory service 106 itself, or by a process, program, or service under the control of the managed directory service 106, or by a process, program or service that the managed directory service 106 communicates with, or by a combination of these and/or other such services or entities.

In an embodiment, the managed directory service 106 also provides authorization services which are used to authorize a user, computer system, process, automated process or other such entity to at least determine which actions of one or more possible actions that entity is authorized to perform. In the case of a computer system resource such as a file system resource, actions that an entity is or is not authorized to perform include, but are not limited to, creating file systems on the file system resource, destroying file systems on the file system resource, attaching to file systems on the file system resource, detaching from file systems on the file system resource, providing access links to file systems on the file system resource, reclaiming access links to file systems on the file system resource, allowing reads from file systems on the file system resource, allowing writes to file systems on the file system resource and/or other such file system resource actions.

Actions on system resources include, but are not limited to, actions on directories, files, applications, data, databases, links to other resources, system drivers, operating systems, virtual machines and/or other such system resource objects thereon and may include such actions as the actions mentioned herein. Actions to start, stop, reclaim, destroy and/or otherwise manage the system resources as well as other such actions are also included in the available actions. Authorization to perform actions are managed by an entity such as a credentialing or policy system such as a system that maintains a set of credentials and/or policies related to a certain entity and determines, based at least in part on the set of credentials and/or policies which actions an entity is authorized to perform. The actions that an entity is authorized to perform are static or vary according to a number of factors including, but not limited to, time of day, type of credentials, system policies, nature, type or location of the object being accessed or a combination of these and/or other such authorization factors. In one embodiment, a computer system entity is authorized only to read certain files on a file system, to read and write certain other files on a file system, and to add and delete certain other files on a file system. A different computer system entity is authorized to perform any actions on the file system, but only if those actions are initiated from a certain location and at a certain time. In one embodiment, one or more processes are authorized only to write to a file on a file system, such as, for example, a system log, while other processes are only be authorized to read from the file. Other types of operations that are authorized by the managed directory service authorization system and such other types of operations are also considered as being within the scope of the present disclosure.

The managed directory service 106, in an embodiment, also provides directory services which provide an authenticated entity access to computer system resources according to the authorization credentials and/or policies. The directory services are web-based computer systems that host or otherwise provide access to directories. In an embodiment where a computer system entity is authorized to read and write a certain data store on a computer system resource such as a file system resource, the ability to do so is provided by the directory services. Directory services also provide access to the file system resource by providing links to the file system resource locations such as by a URI object or some other such linkage. The URI is provided by the computer system client device, or by a process running at the data center, or by a process running on a computer system connected to the datacenter, or by the managed directory service 106 or by a combination of these and/or other such computer system entities.

In an embodiment, access to the third-party service's resources is controlled via its directory 108, which is maintained by the managed directory service 106. The directory 108 includes one or more groups, whereby each group is assigned with one or more users. For each user, the directory 108 maintains one or more user attributes including, but not limited to, a username, contract information (e.g., physical address, electronic address, telephone numbers, etc.), and the like. Further, via the directory 108, the third-party service 102 assigns permissions to each group defined in the directory 108. These permissions provide access control to resources managed by the third-party service 102. In an embodiment, due to the relationship between the third-party service 102 and the contractor service 104, the third-party service transmits a request to the managed directory service 106 to establish a link between the third-party service directory 108 and a directory 110 of the contractor service 104 to enable users of the contractor service 104 to access resources of the third-party service 102 subject to permissions defined by the third-party service 102.

In response to the request from the third-party service 102, the managed directory service 106 generates a contractor group 112 within the directory 108 of the third-party service 102. In one embodiment, a group within a directory is used for managing collections of users. The contractor group 112 generated by the managed directory service 106 in response to the request is used specifically for linking the directory 108 to a directory 110 of the contractor service 104. In one embodiment, the managed directory service 106 provides the third-party service 102 with an option to name the contractor group 112. In order to populate the contractor group 112, the managed directory service 106 generates an invitation 116 usable by the contractor service 104 to establish the directory link. In one embodiment, the invitation 116 includes a URI that directs an entity processing the invitation 116 to the managed directory service 106 to accept the invitation to establish the directory link and to allow other users to be shared via the directory link. The managed directory service 106 provides the invitation 116 to the third-party service 102 for delivery to the contractor service 104. In an embodiment, the managed directory service 106 provides the invitation 116 to the contractor service 104 directly. The third-party service 102 provides the contact information for the contractor service 104, which the managed directory service 106 uses to provide the invitation 116 to the contractor service 104. In an embodiment, the URI includes a code is associated with the newly created group, either directly or indirectly (e.g., by an association with the third-party service). This code is used by the managed directory service 106 to identify the corresponding directories of the third-party service 102 and the contractor service 104, as well as the newly created contractor group 112.

In response to receiving the invitation 116 from either the third-party service 102 or the managed directory service 106, the contractor service 104 utilizes the URI specified in the invitation 116 to access the managed directory service 106. The managed directory service 106 presents, via an interface, information regarding the directory link to the contractor service 104 and prompts the contractor service 104 to determine whether to approve the proposed directory link. The information regarding the directory link, in one embodiment, includes the identity of the third-party service 102, the name of the contractor group 112 created within the directory 108 of the third-party service 102, and the like. If the contractor service 104 approves the invitation 116, the managed directory service 106 creates a third-party contract group 114 within the directory 110 of the contractor service 104. Similar to the contractor group 112, the third-party contract group 114 is used for establishing the link between the directory 108 and the directory 110. In one embodiment, the managed directory service 106 enables the contractor service 104 to provide a name for the third-party contract group 114 within the directory 110.

In an embodiment, the contractor service 104 selects the users that are included in the newly created third-party contract group 114. These users are assigned to perform one or more tasks on behalf of the third-party service 102 but are employed by the contractor service 104. In one embodiment, the contractor service 104 determines which user attributes are shared with the third-party service 102 via the directory link. The contractor service 104 enables information, such as name, electronic addresses, physical addresses, telephone numbers, and the like for each user to be shared with the third-party service 102 through the third-party contract group 114. In an embodiment, the managed directory service 106 prompts the contractor service 104 to define one or more user attribute mappings to link the directory 110 to the directory 108. In one embodiment, if the third-party service expects user names to be labeled as "FirstName," but the contractor service 104 uses "GivenName" for its users, the contractor service 104 generates a mapping that defines how to transform between the different labeling schema. The managed directory service 106 adds this mapping to the third-party contract group 114 to enable translation between the directory 110 and the directory 108.

If the contractor service 104 accepts the invitation 116 from the third-party service 102, and the third-party contract group 114 is generated within the directory 110, the managed directory service 106 transmits a notification to the third-party service 102 to indicate that the invitation has been accepted. The notification, in an embodiment, specifies details regarding the acceptance of the invitation. These details include an identifier for the contractor service 104, Internet Protocol (IP) addresses for the contractor service 104, and other information that is usable to identify the contractor service 104. If these details correspond to an unknown entity, the third-party service 102 can reject the link. If the third-party service 102 approves of the details specified in the notification, the third-party service transmits a response to the managed directory service 106 to confirm that the link can be established. The managed directory service 106 updates the directory 108 and the directory 110 to specify that a link exists between contractor group 112 and third-party contract group 114.

In an embodiment, in response to the link between the contractor group 112 and the third-party contract group 114 being established, the managed directory service 106 generates symbolic representations of users specified in the third-party contract group 114 within the contractor group 112. In one embodiment, the third-party service 102 is authorized to grant permissions to users in the third-party contract group 114 and illustrated symbolically in the contractor group 112 by assigning these permissions to the contractor group 112. The third-party service 102, however, is granted authority to perform any read-only operation on the users specified in the contractor group 112, such as looking up shared attributes. In one embodiment, the third-party service 102 can extend the user attributes for these users, adding additional information into the directory 108 for each symbolic user. However, the third-party service 102 is not authorized to edit any of the user attributes that are shared into the directory 108 via the contractor group 112. In an embodiment, the established link enables users in the third-party contract group 114 of the contractor service directory 110 to authenticate to the directory 108 using credentials for the contractor service directory 110.

If the third-party service 102 submits a query to the managed directory service 106 to obtain user details for one or more symbolic users specified in the contractor group 112, the managed directory service 106 evaluates the contractor group 112 and identifies the authoritative directory (e.g., directory 110) for these symbolic users. The managed directory service 106 submits a query against directory 110 to obtain the requested user details and provides a response to the query to the third-party service 102. In an embodiment, if the contractor service 104 changes any user details for users within the third-party contract group 114, these changes are propagated symbolically via the directory link to the contractor group 112 and the respective symbolic users.

In an embodiment, either party (e.g., third-party service 102 or contractor service 104) can sever the link between directory 108 and 110. If the third-party service 102 or the contractor service 104 submits a request to the managed directory service 106 to sever the directory link, the managed directory service removes the users from the group in the directory of the entity that submitted the request. This causes any users in the linked groups to also be removed from these linked groups. In one embodiment, if the contractor service 104 removes a user from the third-party contract group 114, the managed directory service 106 removes a symbolic representation of the user from the contractor group 112 in the directory 108. Similarly, if the third-party service 102 removes a symbolic representation of a user from the contractor group 112, the managed directory service 106 removes the user from the third-party contract group 114 of the directory 110. Thus, the managed directory service 106 maintains synchronicity between the linked directory groups.

In one embodiment, the request from the third-party service 102 to establish the link between directory 108 and directory 110 specifies an expiration date for the link. The managed directory service 106 updates, in response to the request specifying an expiration date, a directory database to indicate that the link between directory 108 and directory 110 is set to expire on the expiration data specified in the request. The managed directory service 106 queries this directory database to identify any applicable expiration dates. If an expiration date for a link has elapsed, the managed directory service 106 terminates the link between directory 108 and directory 110. In one embodiment, this is accomplished by removing the contractor group 112 from directory 108 and the third-party contract group 114 from directory 110. In an alternative embodiment, the managed directory service 106 removes the users from the third-party contract group 114 or the symbolic users from the contractor group 112. Since both groups are linked, removal of the users or symbolic users results in the groups being vacated. While expiration dates are used extensively throughout the present disclosure for the purpose of illustration, other expiration conditions are usable to determine whether to automatically terminate the link between the contractor group 112 and the third-party contract group 114. In one embodiment, the expiration condition is defined by the termination of a contract between the third-party service 102 and the contractor service 104. The third-party service 102 or the contractor service 104 provides an indication that the contract is terminated. Alternatively, the managed directory service 106 evaluates one or more conditions of the contract to determine whether any of these conditions are met. If so, this serves as an indication of contract expiration. In another embodiment, an expiration condition is met if a pre-defined period of time has passed and no further authorization is provided by the third-party service 102 or the contractor service 104 to maintain the link. In one embodiment, the expiration condition is met if the pre-defined period of time has passed, regardless of input by the third-party service 102 or the contractor service 104. If an expiration condition is met, the managed directory service 106 terminates the link.

In an embodiment, a user of the contractor service 104 submits a request to access one or more resources provided by the third-party service 102. The request includes an authentication claim for authentication against the directory 108 of the third-party service 102. In an embodiment, an authentication claim is a collection of information sufficient to satisfy one or more requirements for at least one mode of authentication. In one embodiment, the authentication claim is a username/password pair. In another embodiment, the authentication claim is a username/password pair combined with a third factor. In another embodiment, the authentication claim is a digitally signed message. In some embodiments, the authentication claim is provided all at once, but in others it is provided in subsets (e.g., with multi-factor authentication, etc.). In response to the request, the third-party service 102 provides the authentication claim to the managed directory service 106, which determines, based at least in part on an identifier of the user specified in the request, that the directory 110 is the authoritative directory for authentication of the user. In one embodiment, the managed directory service 106 identifies the symbolic representation of the user in the contractor group 112 and determines, based at least in part on the user attributes of the user, that the third-party contract group 114 is the authoritative location of the user's profile. The managed directory service 106 uses the directory 110 to verify the authentication claim and determines whether the user is authenticated. If the user is not authenticated, the managed directory service 106 transmits a notification to the third-party service 102 to indicate failure to authenticate the user. However, if the user is authenticated against the directory 110, the managed directory service 106 transmits a notification to the third-party service to indicate that the user has been authenticated. Thus, the user can utilize a single set of credentials for the contractor service 104 to access the third-party service 102.

Figure 2:
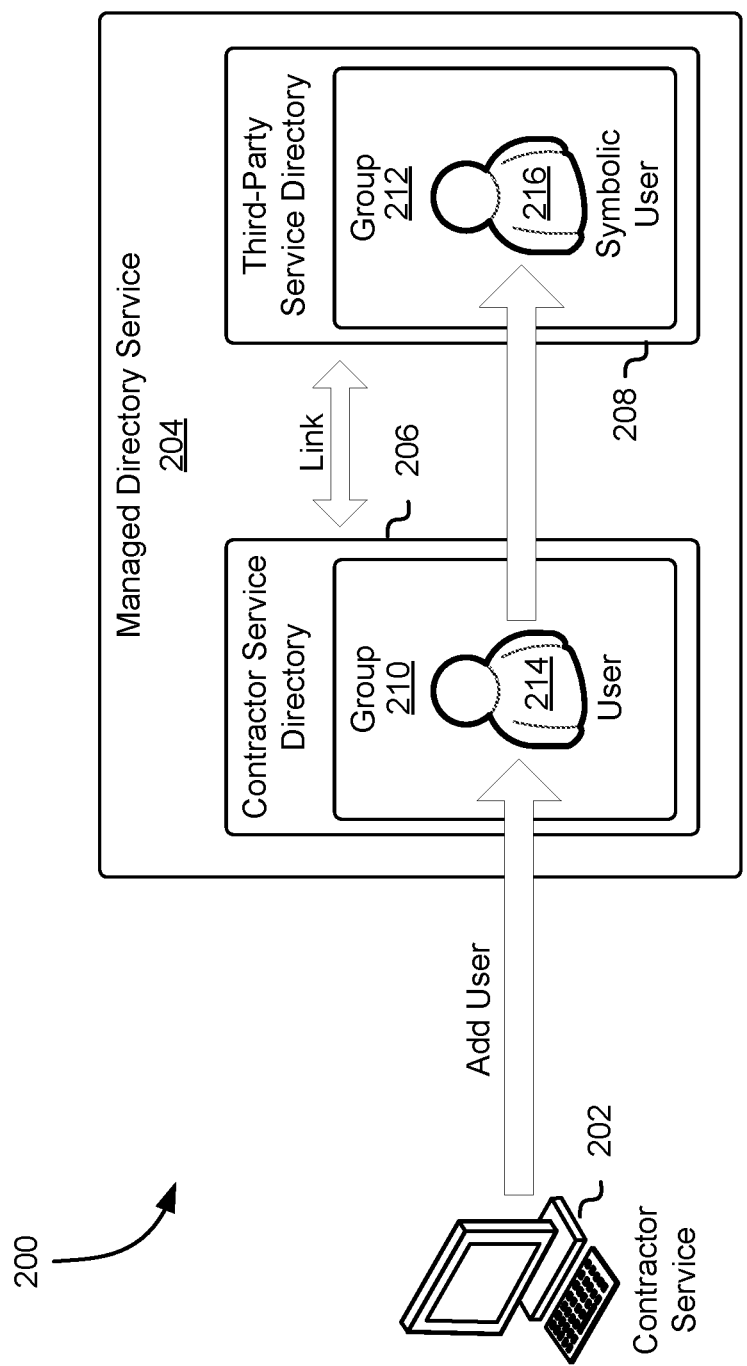
FIG. 2 shows an illustrative example of a system in which a symbolic user is added to a linked directory group in response to the addition of a user to a directory group in accordance with at least one embodiment.

FIG. 2 shows an illustrative example of a system 200 in which a symbolic user 216 is added to a linked directory group 212 in response to the addition of a user 214 to a directory group 210 in accordance with at least one embodiment. In the system 200, a link has been established between a group 210 of a contractor service directory 206 and a group 212 of a third-party service directory 208. In an embodiment, once the link has been established between group 210 and group 212, the contractor service 202 transmits a request to the managed directory service 204 to add a user 214 to the group 210. This user 214, in one embodiment, is assigned to perform one or more actions on behalf of a third-party service using resources of the third-party service controlled via the third-party service directory 208.

In an embodiment, if the contractor service 202 adds a user 214 to group 210, the managed directory service 204 generates a symbolic representation 216 of the user 214 within group 212 of the third-party service directory 208. The contractor service 202 defines the user attributes of the user 214 that are shared with the third-party service via the third-party service directory 208. These shared user attributes include a subset of user attributes by which the user 214 is defined within the contractor service 202 organization. Thus, the contractor service 202 can omit certain attributes that are not to be shared with the third-party service. In an embodiment, if the contractor service 202 and the third-party service utilize distinct user attribute definitions, the managed directory service 204 prompts the contractor service 202 to provide a mapping of user attributes between the contractor service directory 206 and the third-party service directory 208. Thus, if the user 214 is referred to within the group 210 using a particular attribute, the managed directory service 204 utilizes the mapping provided by the contractor service 202 to generate the symbolic representation 216 of the user 214 within the group 212 using the corresponding user attribute specified in the mapping and preferred by the third-party service.

If the third-party service accesses the third-party service directory 208 and submits a query to obtain information regarding the symbolic representation 216 of user 214, the managed directory service 204 determines, based at least in part on an entry corresponding to the group 212 in a directory database, that the contractor service directory 206 is the authoritative directory for the user 214. The managed directory service 204 accesses the contractor service directory 206 to identify the user attributes for the user 214 and provides this information to the third-party service to fulfill the query. Thus, if the contractor service 202 makes any changes to the user attributes of the user 214, these changes are reflected across the various linked groups via the symbolic representation 216 of the user 214 in these groups.

Figure 3:
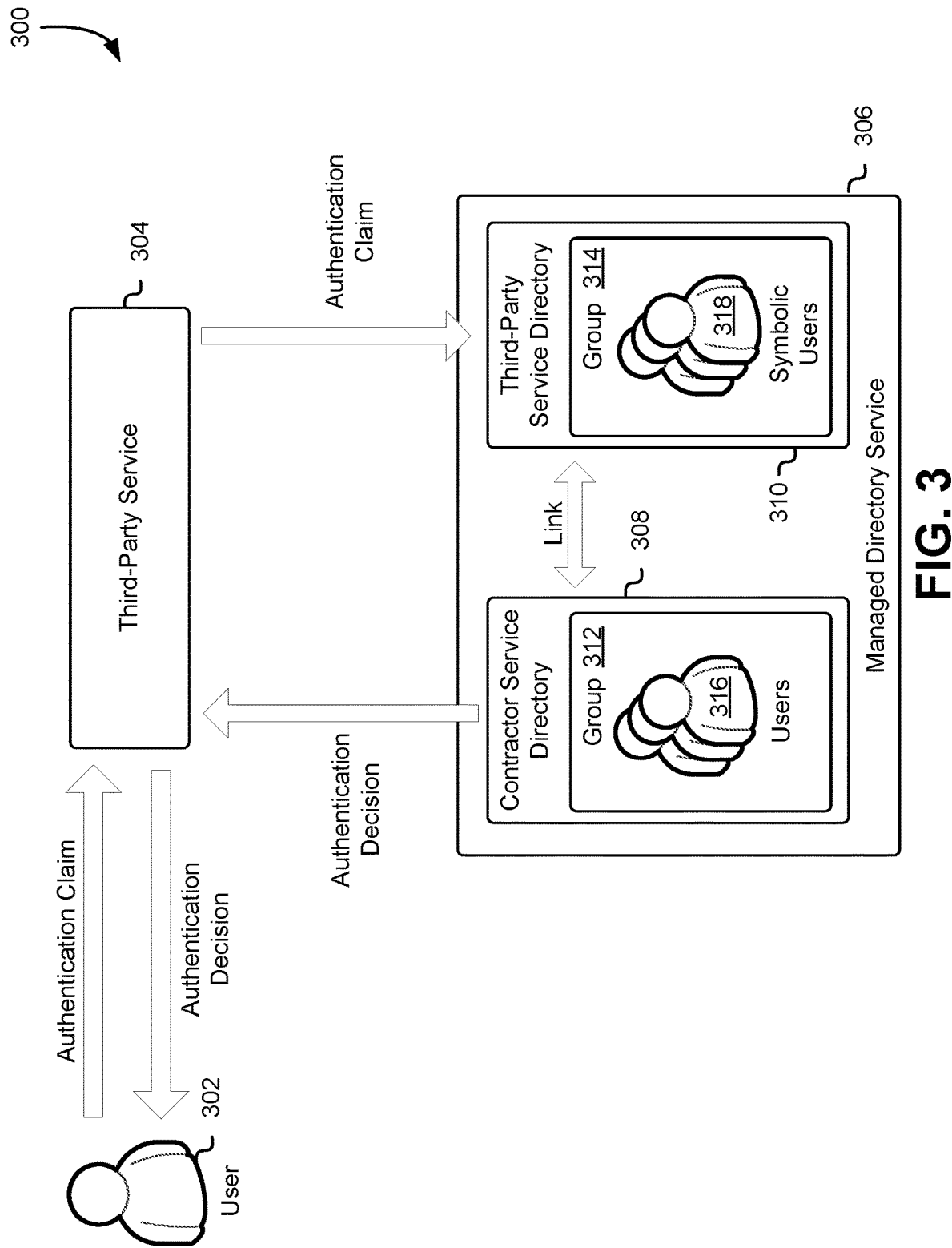
FIG. 3 shows an illustrative example of a system in which an authentication claim provided to a third-party service is directed to a linked directory group for verification in accordance with at least one embodiment.

FIG. 3 shows an illustrative example of a system 300 in which an authentication claim provided to a third-party service 304 is directed to a linked directory group 312 for verification in accordance with at least one embodiment. In the system 300, a link has been established between a group 312 of a contractor service directory 308 and a group 314 of a third-party service directory 310. This link enables users in the group 312 of the contract service directory 308 to authenticate to the directory of the third-party service 304 using credentials for the contract service directory 308. In an embodiment, a user 302 submits an authentication claim to a third-party service 304. In an embodiment, the authentication claim specifies identifying information of the user 302 (e.g., username, employee identifier, etc.) as well as authentication information (e.g., hash of a password, data encrypted using a cryptographic key, credentials, etc.) usable to authenticate the user 302. The third-party service 304, in response to receiving the authentication claim from the user 302, transmits this authentication claim to the managed directory service 306 for evaluation.

In response to receiving the user's authentication claim from the third-party service 304, the managed directory service 306 accesses the third-party service directory 310 to identify a group that includes the user 302 and information usable to verify the authentication claim. In an embodiment, the managed directory service 306 determines that the user 302 is identified in a group 314 comprising a set of symbolic users 318. As noted above, a symbolic representation of a user serves as an indication that another directory serves as the authoritative directory for authentication decisions. In one embodiment, the group 314 in the third-party service directory 310 stores metadata specifying information (e.g., user attributes) of the users corresponding to the set of symbolic users 318. This metadata comprises a reference to the corresponding users in the contractor service directory 308. In an embodiment, the reference is an identifier (e.g., a URI corresponding to the contractor service directory 308, with an identifier of the corresponding user in the group 312) that a directory control sub-system (described below) of the managed directory service 306 utilizes to perform a lookup to determine a network location for authentication to the contractor service directory 308. In some embodiments, additional authentication information is requested once requirements of the contractor service directory 308 are determined and submitted to the contractor service directory 308. In one embodiment, the third-party service defines additional authentication mechanisms applicable to users symbolically represented in group 314. Thus, in an embodiment, if the managed directory service 306 identifies a symbolic representation of the user 302 within the third-party service directory 310, the managed directory service 306 identifies the directory (e.g., contractor service directory 308) that maintains the authoritative information, including information usable to verify the authentication claim, for the user 302. In an embodiment, this enables the user 302 to authenticate to the third-party service directory 310 using credentials for the contractor service directory 308.

The managed directory service 306 accesses the contractor service directory 308 and identifies a group 312 comprising one or more users 316 that are linked to the third-party service directory 310. These one or more users 316 include the user 302. In an embodiment, the managed directory service 306 queries the contractor service directory 308 to identify information usable to verify the authentication claim. As noted above, the managed directory service 306, in one embodiment, provides authentication services which are used to authenticate credentials of a user, computer system, process, automated process or other such entity to at least determine whether that entity is authorized to access the managed directory service 306 and/or the system resources associated with the managed directory service 306. The managed directory service 306, using the information usable to verify the authentication claim and these authentication services, verifies the authentication claim of the user 302. The managed directory service 306 provides an authentication decision to the third-party service 304 to indicate whether the user 302 has been authenticated against the contractor service directory 308.

Figure 4:
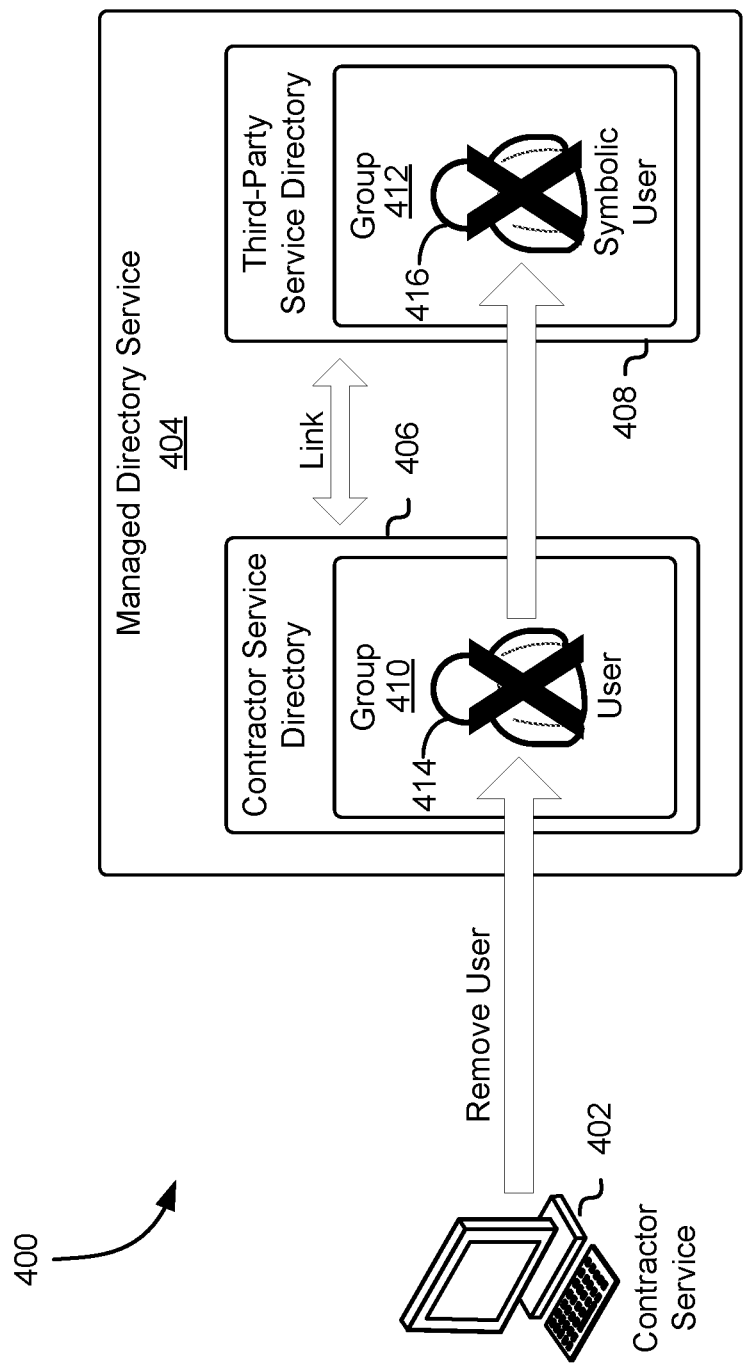
FIG. 4 shows an illustrative example of a system in which a symbolic user is removed from a linked directory group in response to the removal of a user from a directory group in accordance with at least one embodiment.

FIG. 4 shows an illustrative example of a system 400 in which a symbolic user 416 is removed from a linked directory group 408 in response to the removal of a user 414 from a directory group 410 in accordance with at least one embodiment. In the system 400, a contractor service 402 submits a request to a managed directory service 404 to remove a user 414 from a group 410 in the contractor service directory 406 that is linked to a group 412 in the third-party service directory. The request, in one embodiment, indicates that the link between the group 410 and the group 412 is to be severed. Alternatively, in one embodiment, the request indicates a specific identifier of the user 414 that is to be removed from the group 410. This latter request is provided via interaction with an interface of the managed directory service 404 (e.g., a graphical user interface (GUI)) whereby the contractor service 402 removes a graphical representation of the user 414 from a graphical representation of the group 410.

In an embodiment, in response to the request, the managed directory service 404 evaluates an entry corresponding to the group 410 within a directory database to identify the group 412 to which the group 410 is linked. The managed directory service 404 accesses the third-party service directory 408 and removes a symbolic representation 416 of the user 414 from the group 412, making the user 414 unavailable to the third-party service. In an embodiment, if the request from the contractor service 402 is to sever the link entirely, the managed directory service 404 removes the group 410 and the group 412 from their respective directories, thus preventing the third-party service from interacting with user attributes of the removed users.

In an alternative embodiment, the third-party service submits a request to the managed directory service 404 to remove a symbolic representation 416 of the user 414 from the group 412 in the third-party service directory 408. In response to this request, the managed directory service 404 accesses the directory database to identify the authoritative directory for the user 414 (e.g., contractor service directory 406). The managed directory service 404 identifies the group 410 within the contractor service directory 406 that is linked to group 412 and removes the user 414 from group 410. Thus, the process for removal of users is initiated by either the contractor service 402 or the third-party service at any time. Since these users are linked via groups specific to a link between the directories, removal of a user from a linked group in one directory results in the user being removed from a linked group in the other directory.

The link between group 410 and group 412, in one embodiment, is subject to an expiration date specified by the third-party service or contractor service 402 during creation of the link between the group 410 and the group 412. The expiration date is stored in an entry corresponding to the contractor service directory 406 and an entry corresponding to the third-party service directory 408. In an embodiment, the managed directory service 404 evaluates entries in the directory database to determine whether an expiration date has passed for a particular directory link. If the managed directory service 404 determines that the link between group 410 and group 412 has expired as a result of the expiration date having passed, the managed directory service 404 severs the link between group 410 and group 412. In an embodiment, the managed directory service 404 removes group 410 from the contractor service directory 406 and group 412 from the third-party service directory. Thus, user 414 is prevented from accessing resources provided by the third-party service and the third-party service is prevented from accessing user attribute information for the user 414 once the link has been severed.

Figure 5:
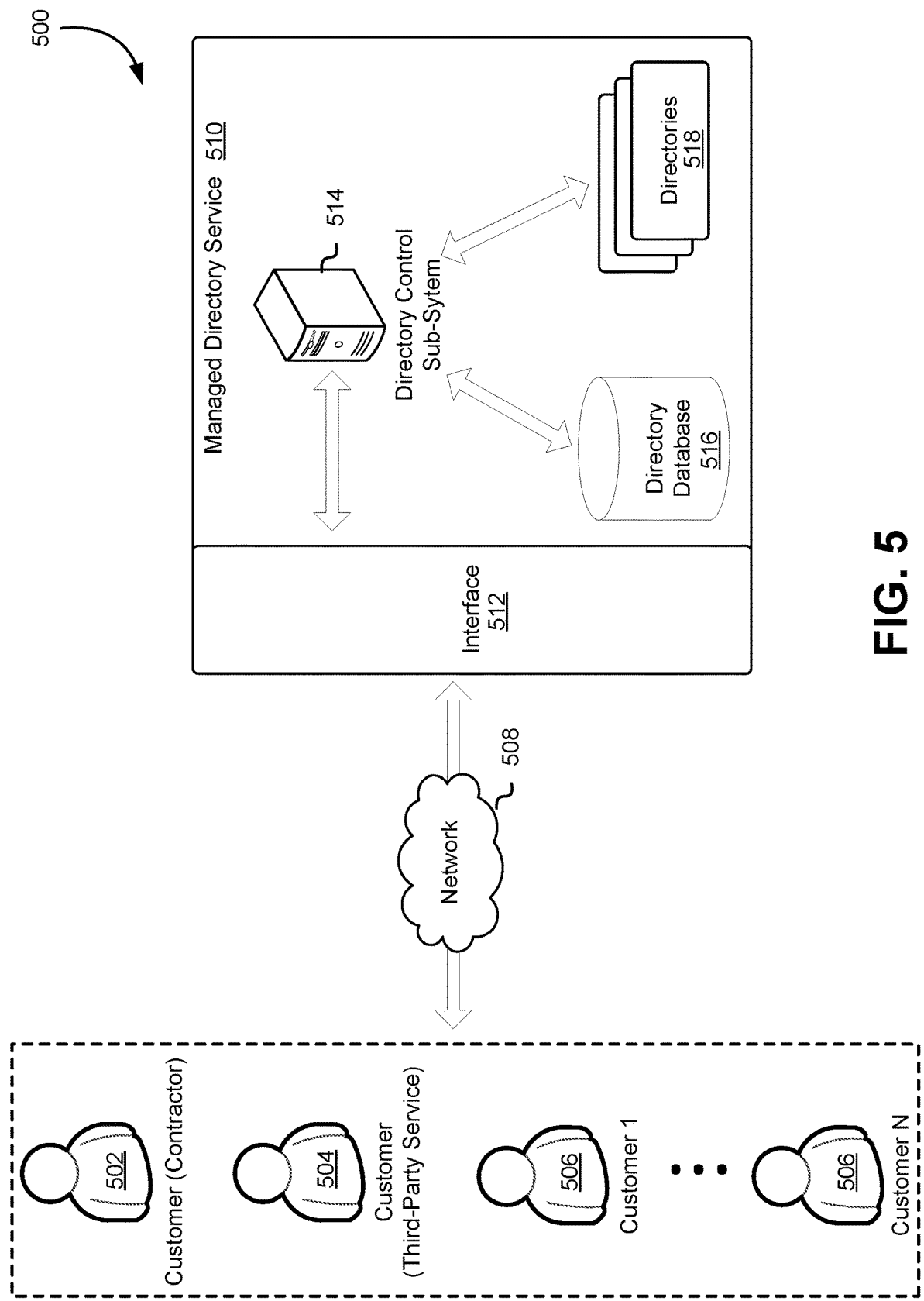
FIG. 5 shows an illustrative example of a system in which various embodiments can be implemented.

FIG. 5 shows an illustrative example of a system 500 in which various embodiments can be implemented. In the system 500, a managed directory service 510 provides a variety of services to enable computer systems and/or computer system client devices (e.g., contractor 502, third-party service 504, and other customers 506) to access system resources including, but not limited to, authentication, authorization and directory services. The managed directory service 510, in one embodiment, provides authentication services which are used to authenticate credentials of a user, computer system, process, automated process or other such entity to at least determine whether that entity is authorized to access the managed directory service 510 and/or the system resources associated with the managed directory service 510. In an embodiment, the managed directory service 510 also provides authorization services which are used to authorize a user, computer system, process, automated process or other such entity to at least determine which actions of one or more possible actions that entity is authorized to perform. In the case of a computer system resource such as a file system resource, actions that an entity is or is not authorized to perform include, but are not limited to, creating file systems on the file system resource, destroying file systems on the file system resource, attaching to file systems on the file system resource, detaching from file systems on the file system resource, providing access links to file systems on the file system resource, reclaiming access links to file systems on the file system resource, allowing reads from file systems on the file system resource, allowing writes to file systems on the file system resource and/or other such file system resource actions.

The managed directory service 510, in an embodiment, also provides directory services which provide an authenticated entity access to computer system resources according to the authorization credentials and/or policies. Directory services also provide access to the file system resource by providing links to the file system resource locations such as by a URI object or some other such linkage. The URI is provided by the computer system client device, or by a process running at the data center, or by a process running on a computer system connected to the datacenter, or by the managed directory service 510 or by a combination of these and/or other such computer system entities. The services described above, in one embodiment, are implemented by the managed directory service 510 via a directory control sub-system 514. The directory control sub-system 514 comprises one or more computer systems of the managed directory service 510 that perform authentication, authorization, and directory operations in accordance with the embodiments described above.

In an embodiment, the managed directory service 510 includes an interface 512, such as a web-based server, that receives incoming requests over a network 508 (e.g., the Internet, etc.). A customer of the managed directory service 510, via the interface 512, submits a request to access one or more file system resources or other resources whose access is regulated via policies and other permissions defined within a directory. The request includes the customer's set of credentials, which are used to authenticate the customer and to determine whether the customer is authorized to access the requested resources. Further, the request specifies information usable to identify a directory that comprises a group that the customer is a member of. This information includes, but is not limited to, a unique username for the customer, contact information for the customer, location information for the customer, and other attributes usable to identify the user within a directory.

In response to the request, the interface 512 passes the request to the directory control sub-system 514 for processing. The directory control sub-system 514 evaluates the request to obtain identifying information for the customer. In an embodiment, the directory control sub-system 514 queries a directory database 516 to identify a directory that includes a profile associated with the customer. The query includes the identifying information obtained by the directory control sub-system 514. The directory database 516 comprises an entry for each directory maintained by the managed directory service 510 within a directory repository 518. Further, the directory database 516, in one embodiment, comprises one or more computer systems that process incoming queries from the directory control sub-system 514 to identify directories that are usable to fulfill requests processed by the directory control sub-system 514. If the directory control sub-system 514 receives a query response from the directory database 516 that specifies a directory identifier corresponding to a directory that includes the customer's profile, the directory control sub-system 514 accesses the directory via the directory repository 518. Using the identified directory, the directory control sub-system 514 authenticates the customer and determines whether the customer is authorized to access the requested resources.

In an embodiment, contractor 502 and third-party service 504 each maintain a directory within the directory repository 518 for managing their corresponding users and resources. If the contractor 502 and the third-party service 504 are engaged in a contractual relationship whereby users of contractor's resources require access to resources of the third-party service 504, the third-party service 504 submits, via the interface 512, a request to create a new group within its directory. In response to the request, the directory control sub-system 514 accesses the third-party service's directory and adds this group to the directory. Through the interface 512, in an embodiment, the third-party service 504 also indicates that this newly created group is to be linked with a directory of the contractor 502. In response to this indication, the directory control sub-system 514 generates an invitation. This invitation includes a URI that directs an entity processing the invitation to the interface 512 of the managed directory service 510. In an embodiment, the directory control sub-system 514 updates a database entry corresponding to the third-party service's directory within the directory database 516 to indicate that the newly created group is used for bridging the directory to a directory of the contractor 502. Further, the directory control sub-system 514 updates an entry corresponding to the contractor's directory to prepare the directory for linkage to the third-party service's directory. The directory control sub-system 514 transmits the invitation to contractor 502. Alternatively, in one embodiment, the directory control sub-system 514, via the interface 512, transmits the invitation to the third-party service 504 to enable the third-party service 504 to provide the invitation to contractor 502.

The contractor 502 uses the URI specified in the invitation to access the interface 512. The directory control sub-system 514, in response to the access request from the contractor 502, accesses the directory database 516 and provides information regarding the link to the contractor 502 via the interface 512. The contractor 502, via the interface 512, indicates whether it accepts the invitation to link its directory to the third-party service's directory. If so, the directory control sub-system 514 generates a new group within the contractor's directory. In an embodiment, the directory control sub-system 514 also updates an entry corresponding to the contractor's directory to indicate creation of this new group and to indicate that this new group is used for bridging the contractor's directory to the third-party service's directory. In an embodiment, the contractor 502 selects, via the interface 512, the users that are to be included in the newly created group. Based at least in part on this selection, the directory control sub-system 514 updates the group to include the selected users.

The directory control sub-system 514 transmits a notification to the third-party service 504 to indicate that the invitation has been accepted by contractor 502. In the notification, the directory control sub-system 514 includes information usable by the third-party service 504 to identify the entity that accepted the invitation, as well as a request to approve the link between the directories. If the third-party service 504 accepts the invitation, the directory control sub-system 514 updates the entries corresponding to the contractor's directory and to the third-party service's directory to indicate that the link between these directories is now active. Further, in an embodiment, the directory control sub-system 514 updates the newly created group within the third-party service's directory to include a symbolic representation of a user specified in the contractor's directory group. In an embodiment, the third-party service 504, via the interface 512, defines one or more permissions for the newly created group and/or for each symbolic representation of a user specified in the group.

Figure 6:
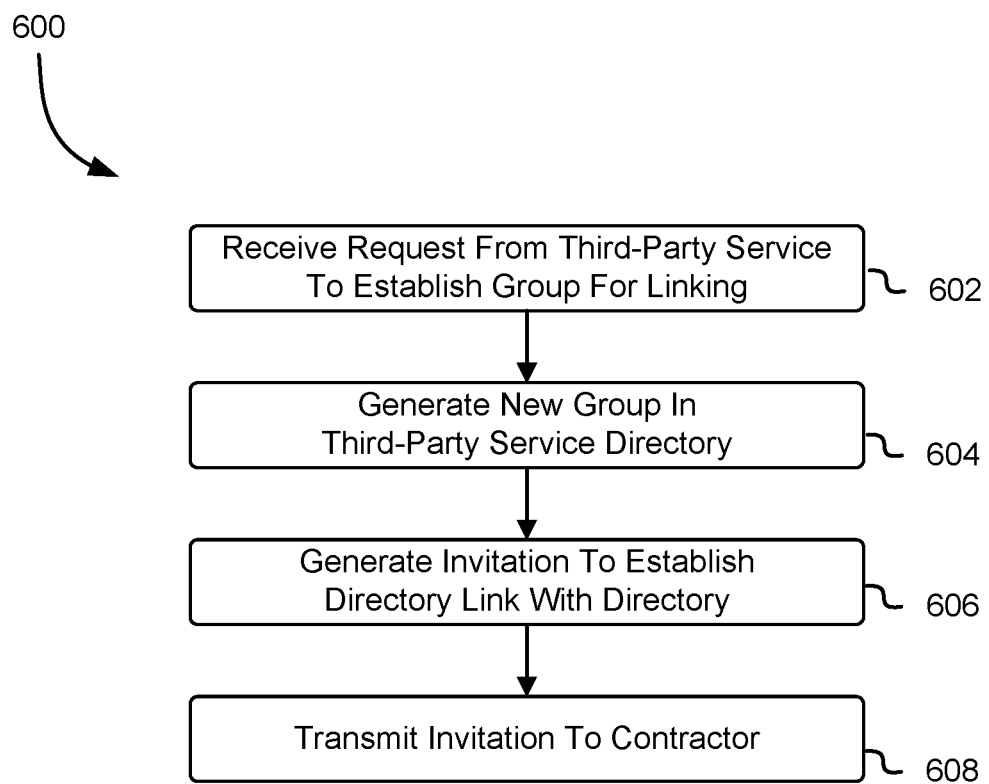
FIG. 6 shows an illustrative example of a process for transmitting an invitation to a contractor service for establishing a directory link between a third-party service directory and a contractor service directory in accordance with at least one embodiment.

FIG. 6 shows an illustrative example of a process 600 for transmitting an invitation to a contractor service for establishing a directory link between a third-party service directory and a contractor service directory in accordance with at least one embodiment. The process 600 is performed by a directory control sub-system of the managed directory service, which processes incoming link requests from customers of the managed directory service. In an embodiment, the managed directory service receives 602 a request from a third-party service to establish a new group in its directory for linking this directory to another directory. The request, in one embodiment, specifies identifying information for a contractor service or other owner of the directory that is the subject of the link. In response to the request, the managed directory service generates 604 a new group within the third-party service's directory. This new group includes an indication that it is used for bridging the third-party service's directory to the other directory specified by the third-party service in its request.

To populate this newly created group, the managed directory service generates 606 an invitation to establish the directory link between the third-party service's directory and the other directory specified in the request. In an embodiment, the invitation includes a URI that, if used, directs an entity to an interface of the managed directory service. Through this interface, the entity is presented with an option to approve the link and to define parameters of a group in their directory. The managed directory service transmits 608 this invitation to the contractor or other entity specified by the third-party service in its request. In one embodiment, rather than transmitting the invitation directory to the contractor or other entity, the managed directory service provides the invitation to the third-party service. This enables the third-party service to transmit the invitation itself to the contractor or other entity.

Figure 7:
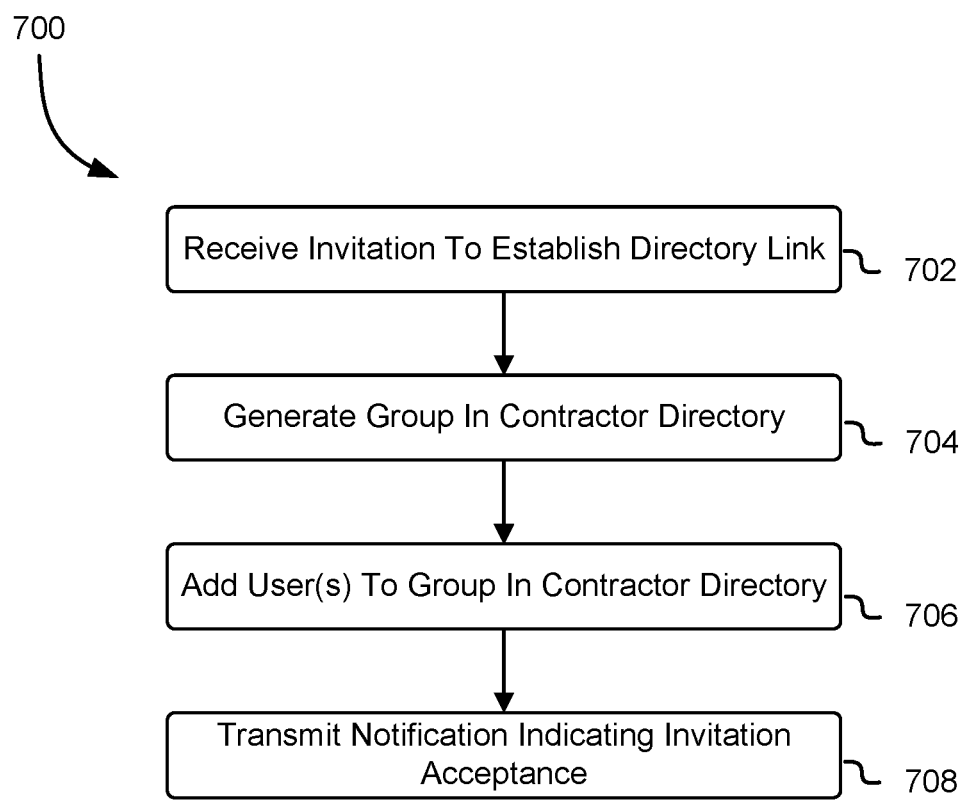
FIG. 7 shows an illustrative example of a process for generating a group within a contractor directory for establishing a directory link in accordance with at least one embodiment.

FIG. 7 shows an illustrative example of a process 700 for generating a group within a contractor directory for establishing a directory link in accordance with at least one embodiment. The process 700 is performed by a contractor service or other recipient of an invitation generated by the managed directory service. It should be noted that one or more operations specified in the process 700 are performable by the managed directory service on behalf of the contractor service or other recipient of the invitation. In an embodiment, the contractor service receives 702, from either the managed directory service or a third-party service, an invitation to establish a directory link between its directory and a directory of the third-party service. As noted above, the invitation includes a URI that directs the contractor service to an interface of the managed directory service. Through the interface, the contractor service determines whether to accept the invitation. If the contractor service accepts the invitation, the managed directory service, on behalf of the contractor service, generates 704 a new group within the contractor service's directory. This new directory is used for establishing the link between the directories.

Through the interface, the contractor service adds 706 one or more users to the group in its directory. The users added to the group are shared with the other directory and are assigned permissions by the third-party service or other entity that controls the other directory. In one embodiment, the contractor service decides which user attributes to share with the other directory. Further, in one embodiment, if the user attributes utilized by the contractor service differ from those utilized by the third-party service, the contractor service provides a user attribute mapping that defines how to transform user attributes between these different schema. The contractor service indicates that it has approved the link and, via the managed directory service, transmits 708 a notification to the third-party service to indicate that the invitation has been accepted.

Figure 8:
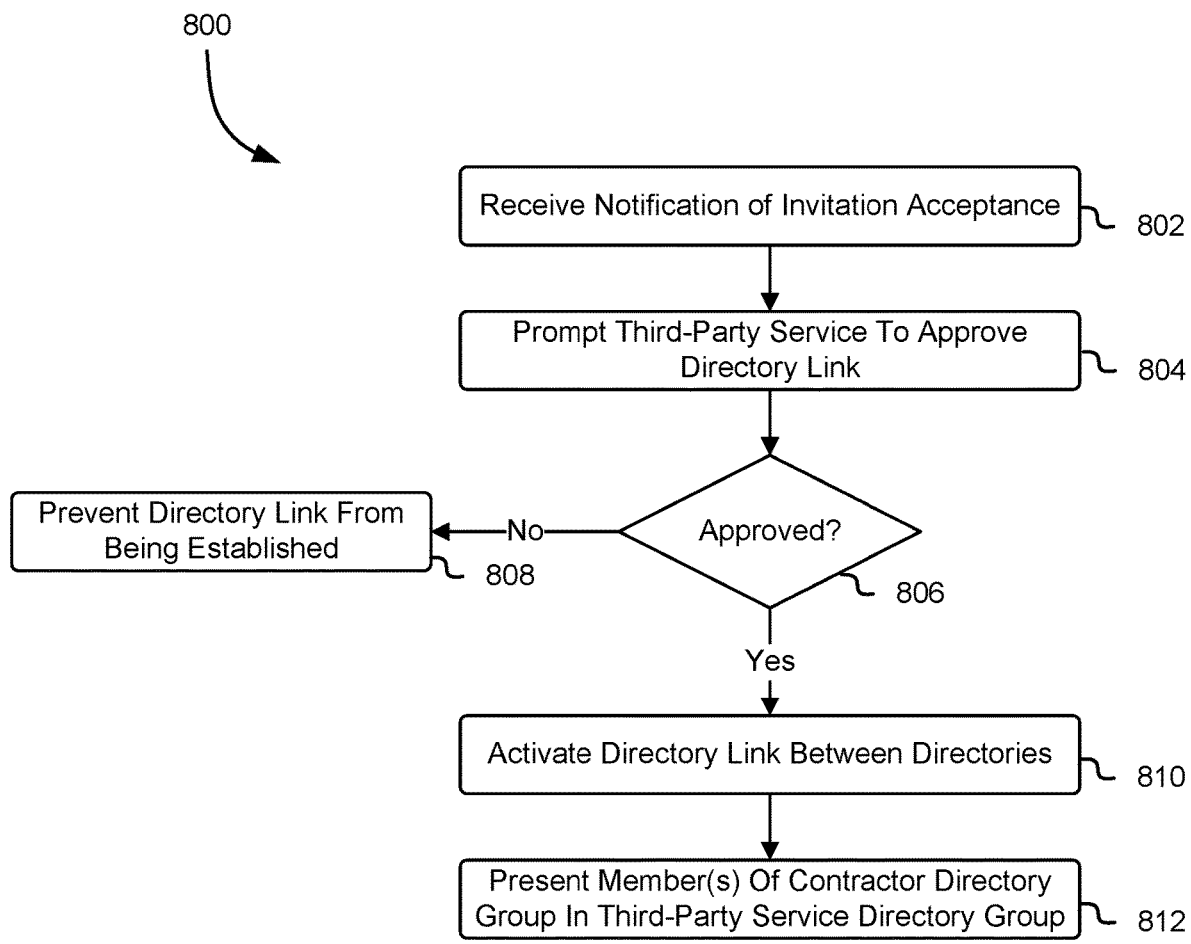
FIG. 8 shows an illustrative example of a process for activating the directory link between a third-party service directory and a contractor directory in accordance with at least one embodiment.

FIG. 8 shows an illustrative example of a process 800 for activating the directory link between a third-party service directory and a contractor directory in accordance with at least one embodiment. The process 800 is performed by the directory control sub-system of the managed directory service. In an embodiment, the managed directory service receives 802 a notification from the contractor service that the invitation has been accepted. This notification is transmitted to the third-party service to inform the third-party service of the invitation acceptance. The managed directory service prompts 804 the third-party service to approve of the directory link. In one embodiment, the managed directory service, via an interface, provides the third-party service with identifying information for the entity that accepted the invitation, such as the entity's IP address, the entity's identifier, the entity's contact information, and the like. This information is usable by the third-party service to determine whether the invitation was accepted by the contractor service or by some other entity that is not authorized to access resources provided by the third-party service. The third-party service provides an indication as to whether it approves of the link. Thus, based at least in part on this indication, the managed directory service determines 806 whether the link has been approved by the third-party service.

If the third-party service does not approve the link, the managed directory service prevents 808 the directory link between the third-party service's directory and the other directory from being established. The managed directory service, in one embodiment, adds the other entity to a blacklist such that acceptance by this other entity is rejected by the managed directory service while the other entity is on the blacklist. However, if the third-party service approves the link, the managed directory service activates 810 the link between these directories. In an embodiment, the managed directory service updates an entry for each directory to indicate that the link between the newly created groups in these directories is active. Further, the managed directory service presents 812 the one or more members of the contractor directory group in the third-party service directory group in the form of symbolic representations of these members. The third-party service can grant permissions to this group or to a subset of members of this group. Further, the third-party service can perform any read-only operation on these symbolic representations of the members in the group, such as looking up shared user attributes and the like. In an embodiment, the directory link between these directories, once established, enables users in the group of the contractor service directory to authenticate to the directory of the third-party service using credentials for the contractor service directory.

Figure 9:
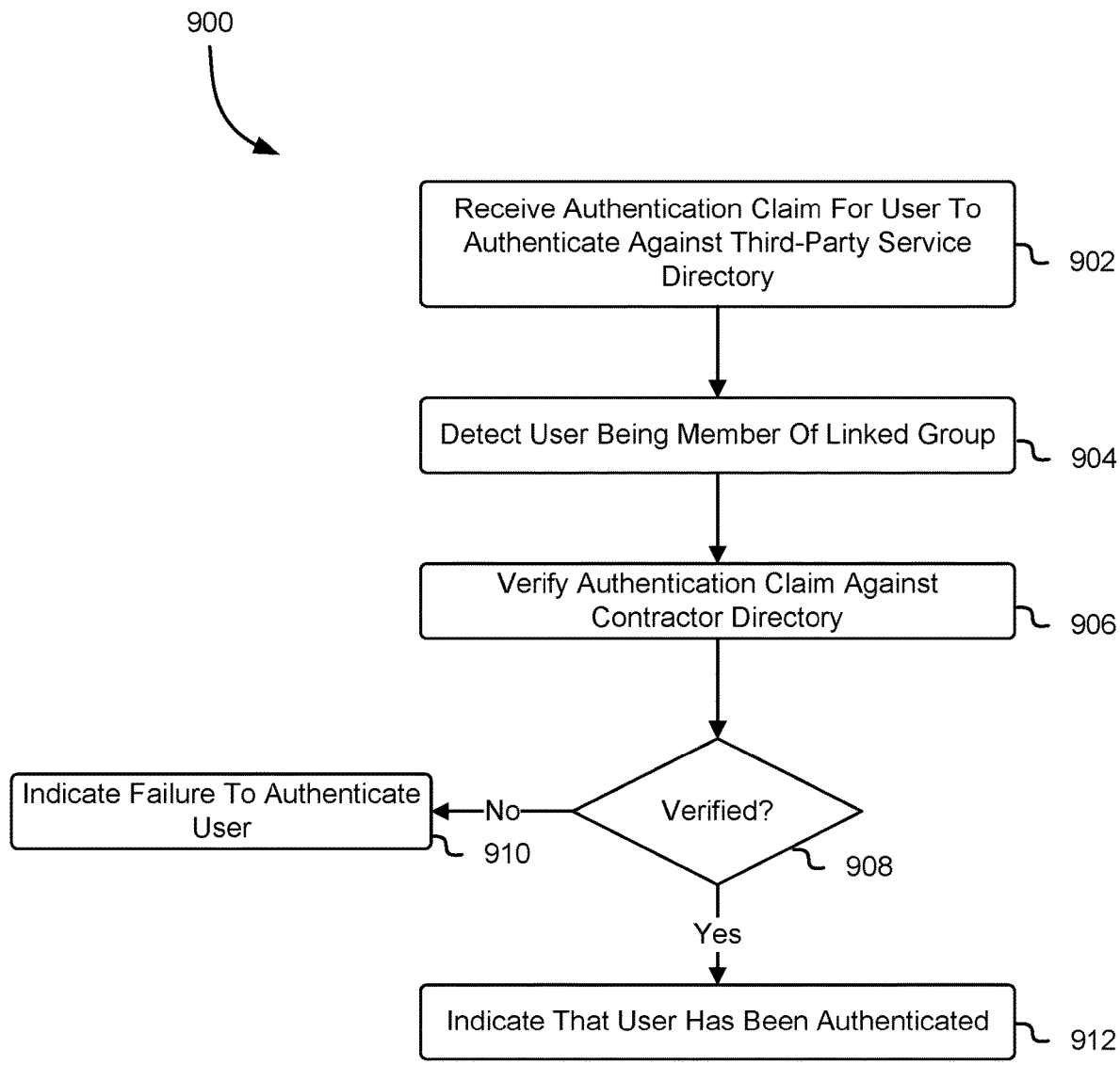
FIG. 9 shows an illustrative example of a process for processing an authentication claim for a user to authenticate against a third-party service directory linked to a contractor directory in accordance with at least one embodiment.

FIG. 9 shows an illustrative example of a process 900 for processing an authentication claim for a user to authenticate against a third-party service directory linked to a contractor directory in accordance with at least one embodiment. The process 900 is performed by the managed directory service in response to receiving 902 an authentication claim for a user to authenticate against a third-party service directory. The authentication claim includes identifying information for the user, as well as credential information usable to authenticate the user. In an embodiment, the managed directory service uses the identifying information specified in the authentication claim to detect 904 that the user is a member of a linked group within the third-party service directory. In one embodiment, the managed directory service identifies, based at least in part on the information specified in the authentication claim and a directory database, the third-party service directory. In the third-party service directory, the managed directory service identifies any group in which the user is a member. A group that linked to a group in another directory specifies, in one embodiment, the existence of the link. Thus, the managed directory service determines whether a group that includes the user specifies that it is linked to another directory.

In an embodiment, the managed directory service accesses the contractor directory linked to the group of the third-party service directory to verify 906 the authentication claim against the contractor directory. The contractor directory serves as the authoritative directory for the user and includes information usable to verify the authentication claim submitted by the user. Using the contractor directory, the managed directory service evaluates the authentication claim to determine 908 whether it is verified in accordance with the information specified in the directory. If the managed directory service is unable to verify the authentication claim, the managed directory service indicates 910 a failure to authenticate the user. This indication, in an embodiment, is provided to the third-party service, which rejects the request from the user to access one or more resources provided by the third-party service. However, if the managed directory service successfully verifies the authentication claim using the contractor service's directory, the managed directory service indicates 912 that the user has been authenticated. In an embodiment, this indication is provided to the third-party service, which uses its directory to determine whether the user is authorized to perform the requested operations and/or to access resources provided by the third-party service.

Figure 10:
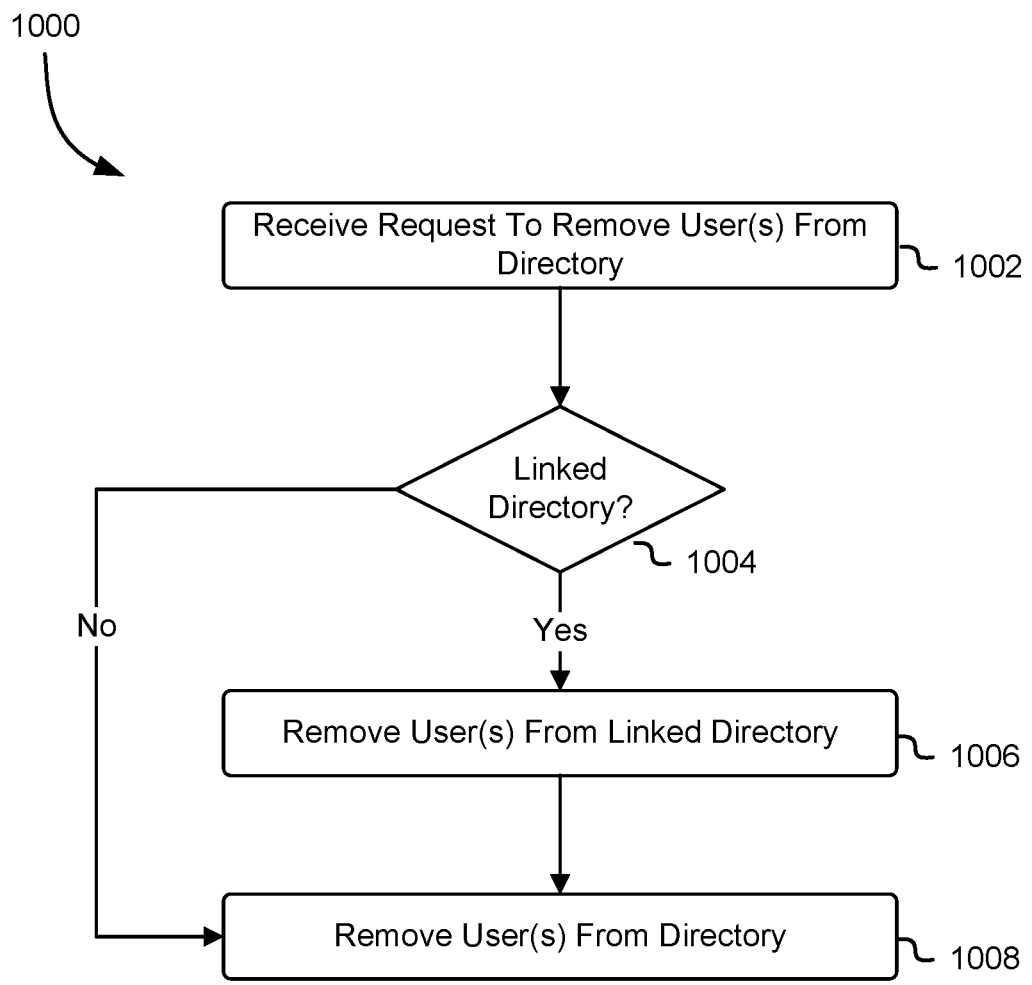
FIG. 10 shows an illustrative example of a process for removing users from a linked directory in accordance with at least one embodiment.

FIG. 10 shows an illustrative example of a process 1000 for removing users from a linked directory in accordance with at least one embodiment. The process 1000, in an embodiment, is performed by the directory control sub-system of the managed directory service in response to receiving 1002 a request to remove a user from a directory group. In one embodiment, the request is made by a third-party service, whose directory group comprises one or more symbolic representations of users. The users are managed and controlled via a directory of a contractor service. The directory of the contractor service and the directory of the third-party service, in one embodiment, are linked. In another embodiment, the request is made by a contractor service, whose directory is linked with a directory of the third-party service. The contractor service's directory serves as the authoritative directory for these users such that user attributes for these users are defined by the contractor service.

In an embodiment, the managed directory service determines 1004 whether the directory specified in the request is linked to another directory. The managed directory service accesses a directory database to identify an entry corresponding to the directory specified in the request. The managed directory service accesses the directory and determines which group the user that is to be removed belongs to. If the group specifies that it is linked to a group of another directory, the managed directory service determines that this directory is linked to another directory. Further, in an embodiment, the managed directory service accesses the group of the linked directory to remove 1006 the one or more users from the group in the linked directory.

If the directory specified in the request is not linked to another directory or the users have been removed from the other directory, the managed directory service removes 1008 the one or more users from the directory. It should be noted that, in an embodiment, the process 1000 is performed without need to receive the request to remove the one or more users from the directory. In one embodiment, the link between the directories is subject to an expiration date. If the expiration date has elapsed, the managed directory service removes the one or more users from the group in the directory and from the group in the linked directory automatically.

Figure 11:
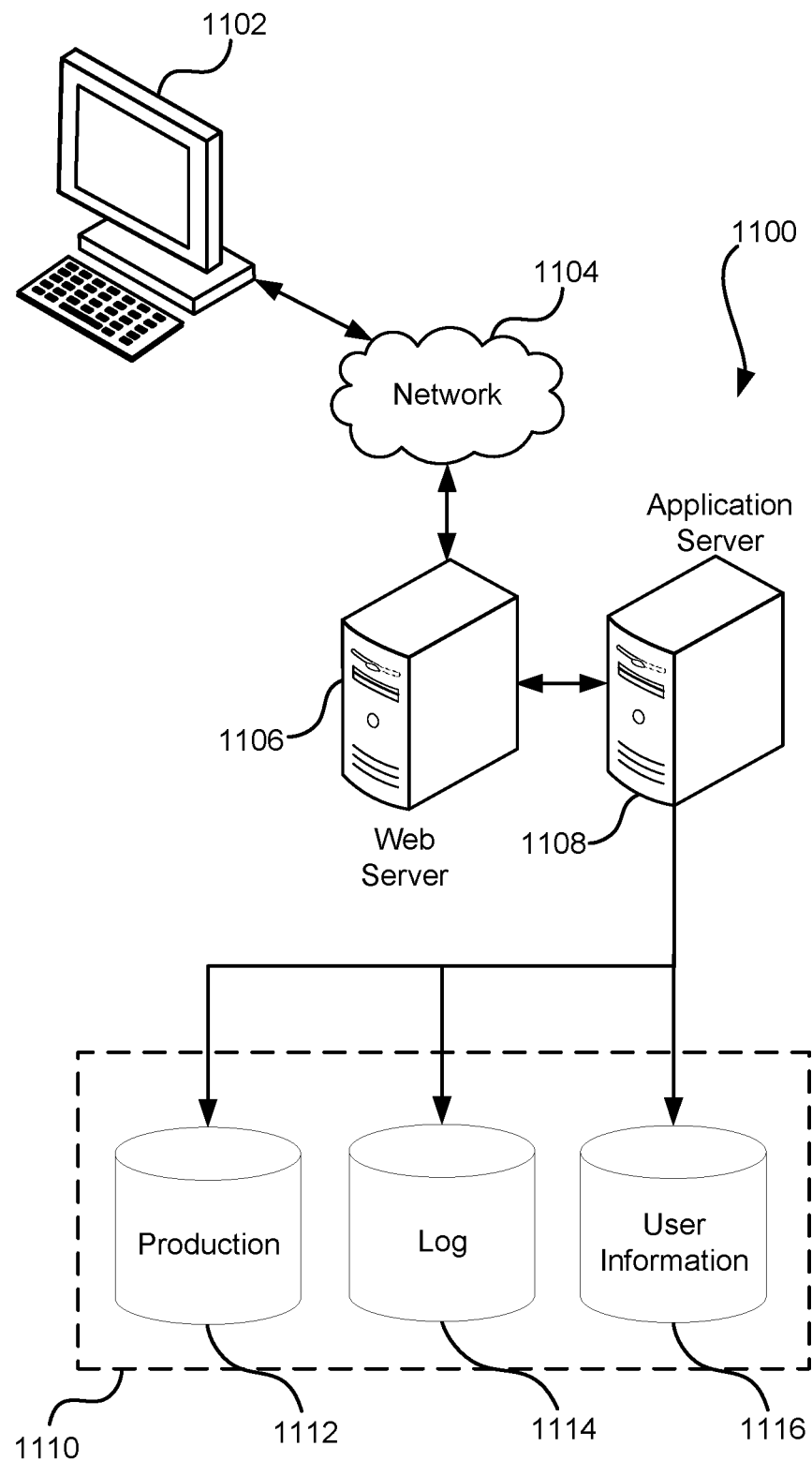
FIG. 11 illustrates a system in which various embodiments can be implemented.

FIG. 11 illustrates aspects of an example system 1100 for implementing aspects in accordance with various embodiments. As will be appreciated, although a web-based system is used for purposes of explanation, different systems may be used, as appropriate, to implement various embodiments. The system includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or system selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the system includes a web server 1106 for receiving requests and serving content in response thereto, although for other networks an alternative device serving a similar purpose could be used as would be apparent to one of ordinary skill in the art.

The illustrative system includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The system, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
creating a first group in a first directory;
obtaining a first request to link a second directory to the first directory via the first group, the first request specifying an expiration condition for the link;
transmitting a second request to authorize linkage of the second directory to the first directory;
obtaining selection of a second group of the second directory;
associating users of the second group with users in the first group;
enabling the users in the first group to authenticate to the first directory using respective credentials of the users of the second group of the second directory;
detecting, at a time after enabling the users in the first group to authenticate to the first directory, that the expiration condition is met; and
as a result of the expiration condition being met, severing the link between the second directory to the first directory.

2. The computer-implemented method of claim 1, wherein the method further comprises:
obtaining a third request to remove the first group from the first directory; and
in response to the third request, severing the link between the second directory to the first directory.

3. The computer-implemented method of claim 1, wherein associating the users of the second group with the users in the first group includes:
detecting addition of the users of the second group to the second group; and
updating the first group to include respective users corresponding to the users of the second group.

4. The computer-implemented method of claim 1, wherein the method further comprises:
obtaining a request to remove a user from the first group; and
removing the user from the second group.

5. A system, comprising:
one or more machine-readable mediums having stored thereon a set of instructions, which if performed by one or more processors, cause the system to at least:
obtain a request to link a second directory to a first directory, wherein:
the first directory and the second directory are managed directories that regulate access to resources via an access policy; and
the link is subject to an expiration condition specified in the request;
determine a group in the second directory; and
enable users in the group to authenticate to the first directory using credentials for the second directory;
at a time after enabling the users in the group to authenticate to the first directory, terminate the link between the second directory to the first directory as a result of detecting that the expiration condition is met.

6. The system of claim 5, wherein the set of instructions further cause the system to:
generate, in response to the request, a second group within the first directory;
detect addition of the users to the group in the second directory; and
update the second group to include respective users corresponding to the users.

7. The system of claim 5, wherein the set of instructions further cause the system to:
provide a second request to obtain authorization of the link of the second directory to the first directory; and
establish the link between the second directory and the first directory in response to receiving an indication specifying that the link is authorized.

8. The system of claim 5, wherein
the set of instructions further cause the system to prevent the users in the group from authenticating to the first directory using the credentials for the second directory as a result of terminating the link.

9. The system of claim 5, wherein the set of instructions further cause the system to:
obtain a request to remove a user from the group;
remove the user from the group; and
prevent the user from authenticating to the first directory using a set of credentials of the user for the second directory.

10. The system of claim 5, wherein the set of instructions further cause the system to transmit, in response to the request, a second request to generate the group in the second directory.

11. The system of claim 5, wherein:
the second directory defines attributes of the users in the group; and
the attributes are accessible via the first directory in a read-only format.

12. The system of claim 5, wherein the set of instructions further cause the system to:
obtain a request to remove the group from the second directory; and
in response to the request, terminate the link.

13. A non-transitory computer-readable storage medium storing thereon executable instructions that, if executed by one or more processors of a computer system, cause the computer system to at least:
obtain a request to link a second directory to a first directory;
determine selection of a group in the second directory;
enable users in the group to authenticate to the first directory using credentials for the second directory;
detect that an expiration condition for the link has been met; and
prevent the users in the group from authenticating to the first directory using the credentials for the second directory as a result of the expiration condition being met.

14. The non-transitory computer-readable storage medium of claim 13, wherein the instructions further cause the computer system to:
remove, in response to a second request, a user from the group; and
prevent the user from authenticating to the first directory using a set of credentials of the user for the second directory.

15. The non-transitory computer-readable storage medium of claim 13, wherein:
the second directory defines attributes of the users in the group; and
the instructions further cause the computer system to provide the attributes of the users via the first directory in a read-only format.

16. The non-transitory computer-readable storage medium of claim 13, wherein the instructions further cause the computer system to transmit, in response to the request, a second request to approve the link and to generate the group in the second directory.

17. The non-transitory computer-readable storage medium of claim 13, wherein the instructions further cause the computer system to establish the link between the second directory and the first directory in response to receiving an indication specifying that the link is authorized.

18. The non-transitory computer-readable storage medium of claim 13, wherein the instructions further cause the computer system to:
   generate, in response to the request, a second group within the first directory; and
   update the second group to include respective users corresponding to the users in the group in the second directory.

19. The non-transitory computer-readable storage medium of claim 13, wherein the instructions further cause the computer system to:
   obtain a request to remove the group from the second directory;
   remove the group from the second directory; and
   terminate the link.

20. The non-transitory computer-readable storage medium of claim 13, wherein further as a result of detecting that the expiration condition is met, severing the link between the second directory and the first directory.

\* \* \* \* \*